3,317,552
PREPARATION OF CERTAIN HYDROXYBENZO-HETEROCYCLIC COMPOUNDS
Harold A. Kaufman, Piscataway Township, Middlesex County, John R. Kilsheimer, Westfield, and Harold M. Foster, Middlesex, N.J., assignors to Mobil Oil Corporation, a corporation of New York
No Drawing. Filed May 25, 1965, Ser. No. 458,771
8 Claims. (Cl. 260—304)

This invention relates to the manufacture of hydroxy-benzoheterocyclic compounds, such as 4-hydroxybenzothiophene. It is particularly concerned with an improved process for the liquid phase synthesis of them.

By way of example, the compound, 4-hydroxybenzothiophene, is an organic intermediate for the synthesis of N-substituted benzothienylcarbamates, which have excellent pesticidal properties. This intermediate was prepared by reaction of 4-keto-4,5,6,7-tetrahydrobenzothiophene and sulfur by Fieser and Kennelly (J. Am. Chem. Soc., 57, 1611–1616 (1935)). They reported the best yields obtained were 46%. Attempts have been made to reproduce this preparation by other workers (e.g. Kitchen and Sandin, J. Am. Chem. Soc., 67, 1645–1646 (1945)) and by the inventors, but the reproducibility was poor and yields were low. This was attributable to difficulties in controlling the exothermic reaction which resulted in overheating and excessive tar formation.

Other hydroxy-benzoheterocyclic compounds, such as hydroxybenzofuran and hydroxyquinoline, are well known in the art, as are their uses. They, also, can be made by dehydrogenating the corresponding at least partially saturated keto-benzoheterocyclic compound with sulfur. As with the aforementioned hydroxybenzothiophene synthesis, however, difficulties of control are encountered.

It is a discovery of this invention that the at least partially saturated keto-benzoheterocyclic compounds can be dehydrogenated with sulfur in higher yield and with reproducible results, when the dehydrogenation is conducted in a solvent for both the sulfur and the keto-benzoheterocyclic compound reactant.

Accordingly, a broad object of this invention is to provide an improved process for preparing hydroxy-benzoheterocyclic compounds. Another object is to provide an improved process for carrying out the dehydrogenation of a keto-benzoheterocyclic compound reactant. A specific object is to provide an improved process for dehydrogenating a hydrogenated keto-benzoheterocyclic compound reactant with elemental sulfur using a solvent for both the sulfur and the keto-benzoheterocyclic compound reactant. Another specific object is to provide an improved process for preparing 4-hydroxybenzothiophene. Other objects and advantages of this invention will become apparent to those skilled in the art from the following detailed description.

This invention provides a process for producing hydroxy-benzoheterocyclic compounds that comprises heating a solution of elemental sulfur and a keto-benzoheterocyclic compound reactant in a solvent for both sulfur and said reactant.

The material that is dehydrogenated in the process of this invention is an at least partially saturated keto-benzoheterocyclic compound reactant. This reactant is an organic compound having at least one ring containing six carbon atoms, one of said carbon atoms having attached thereto a keto oxygen atom, and having a heterocyclic ring fused thereto. At least two of the carbon atoms of said reactant are saturated with respect to hydrogen. The saturated keto-heterocycle compound reactant can be moderately substituted with lower alkyl ($C_1$–$C_3$) groups, nitrile groups or ester groups (—COOR) where R is a lower alkyl ($C_1$–$C_3$) group. Non-limiting examples of the keto-benzoheterocyclic compound reactant are 4-keto-4,5,6,7-tetrahydrobenzothiophene;
4-keto-2,3,4,5,6,7-hexahydrobenzothiophene;
4-keto-4,7-dihydrobenzothiophene;
4-keto-4,5,6,7-tetrahydro-7-cyanobenzothiophene;
4-keto-2,4,5,6,7,7a-hexahydrobenzothiophene;
4-keto-2,3,3a,4,5,6,7,7a-octahydrobenzothiophene;
4-keto-4,5,6,7-tetrahydrobenzothiazole;
4-keto-4,5,6,7-tetrahydrobenzoxazole;
4-keto-4,5,6,7-tetrahydrobenzofuran;
7 - keto - 2,3, - dimethyl-2,3,3a,4,5,6,7,7a-octahydrobenzofuran;
5-keto-5,6,7,8-tetrahydroquinoline; and
4-keto-6-methyl-4,5,6,7-tetrahydrobenzothiophene.

The sulfur reactant is elemental sulfur in any of its forms, i.e. rhombic, monoclinic, or amorphous. Stoichiometrically, there is required at least one mole of sulfur for each mole of hydrogen ($H_2$) removed. In practice, however, it is preferred to use a molar excess over the stoichiometric amount. Thus molar excesses of one mole to 2.5 moles are effective. A substantial excess should be avoided, because yields are adversely affected.

The solvent employed in the process of this invention must be capable of dissolving both the sulfur and the 4-keto-benzothiophene reactant in the cold or after warming and have a boiling point of between about 175° C. and about 350° C. However, solvents boiling below about 300° C. are preferred to minimize the need for expensive temperature control means. In general, utilizable solvents are oxygen-containing, non-carbonyl-containing compounds, such as alcohols, glycols, ethers, and glycolethers, and various aromatic hydrocarbons. Non-limiting examples of utilizable solvents are diamyl ether, amyl phenyl ether, benzyl ethyl ether, butylene glycol, 2-butoxy-1-ethanol, butyl phenyl ether, cuminyl alcohol, decanol, diethylene glycol, mono-n-butyl ether, diphenyl ether, dodecanol, ethylbenzyl alcohol, 2-ethyl-1-hexanol, glycerol methyl ether, hexadecanol, di-n-heptyl ether, dioctylether, dinaphthyl ether, methyl-cyclohexanol, propanediol, triethylene glycol, 2-phenoxy-1-ethanol, 1-methyl naphthalene, and dimethylnaphthalene.

In general, the reaction is carried out at temperatures between about 175° C. and about 350° C. and, preferably, between about 200° C. and about 275° C. The reaction time will be between about ½ hour and about 5 hours. Usually, the reaction time is between about one hour and about 3 hours.

In the following example, the process of this invention is demonstrated by the dehydrogenation of 4-keto-4,5,6,7-tetrahydrobenzothiophene to 4-hydroxybenzothiophene, using diphenyl ether, a preferred solvent. It will be understood that other solvents can be used and that, using this process, other keto-benzoheterocyclic compound reactants can be dehydrogenated to the corresponding hydroxy compound, as described hereinbefore.

*Example*

A mixture of 22 parts 4-keto-4,5,6,7-tetrahydrobenzothiophene, 9 parts sulfur, and 30 parts diphenyl ether were charged to a reaction vessel provided with a stirrer and a distillation head. Upon heating and stirring the 4-keto-4,5,6,7-tetrahydrobenzothiophene and the sulfur dissolved in the diphenyl ether. When the temperature reached 212–217° C., the reaction solution commenced to boil. At a pot temperature of 227° C., $H_2S$ was evolved and exotherm occurred. Reflux was adjusted to a pot temperature of 245° C. and this temperature was maintained for one hour. Then, the contents of the reactor were distilled out at 110–165° C. at 4.5 mm. mercury pressure. The distillate was extracted with 10% sodium hydroxide. Upon acidifying the extract there was obtained 14.4 parts 4-hydroxybenzothiophene (M.P.=74–78° C.)

a yield of 65.5%.

In a similar manner, ketones such as 4-keto-4,5,6,7-tetrahydrobenzothiazole; 4-keto-4,5,6,7-tetrahydrobenzofuran; and 4-keto-4,5,6,7-tetrahydrobenzoxazole can be converted, respectively into 4-hydroxybenzothiazole, 4-hydroxybenzofuran, and 4-hydroxybenzoxazole.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing hydroxy-benzoheterocyclic compounds that comprises heating a solution of elemental sulfur and a keto-benzoheterocyclic compound reactant selected from the group consisting of 4-keto-4,5,6,7-tetrahydrobenzothiophene; 4-keto-2,3,4,5,6,7-hexahydrobenzothiophene; 4-keto-4,7-dihydrobenzothiophene; 4-keto-4,5,6,7-tetrahydro-7-cyanobenzothiophene; 4-keto-2,4,5,6,7,7a-hexahydrobenzothiophene; 4-keto-2,3,3a,4,5,6,7,7a-octahydrobenzothiophene; 4-keto-4,5,6,7-tetrahydrobenzothiazole; 4-keto-4,5,6,7-tetrahydrobenzoxazole; 4-keto-4,5,6,7-tetrahydrobenzofuran; 7-keto-2,3-dimethyl-2,3,3a,4,5,6,7,7a-octahydrobenzofuran; 5-keto-5,6,7,8-tetrahydroquinoline; and 4-keto-6-methyl-4,5,6,7-tetrahydrobenzothiophene in a solvent for both sulfur and said reactant selected from the group consisting of diamyl ether, amyl phenyl ether, benzyl ethyl ether, butylene glycol, 2-butoxy-1-ethanol, butyl phenyl ether, cuminyl alcohol, decanol, diethylene glycol, mono-n-butyl ether, diphenyl ether, dodecanol, ethylbenzyl alcohol, 2-ethyl-1-hexanol, glycerol methyl ether, hexadecanol, di-n-heptyl ether, dioctyl ether, dinaphthyl ether, methyl-cyclohexanol, propanediol, triethylene glycol, and 2-phenoxy-1-ethanol.

2. The process defined in claim 1 wherein said solvent is an ether boiling between about 175° C. and about 350° C.

3. The process defined in claim 1 wherein said solvent is diphenyl ether.

4. The process defined in claim 2 wherein said keto-benzoheterocyclic compound reactant is 4-keto-4,5,6,7-tetrahydrobenzothiophene.

5. The process defined in claim 3 wherein said keto-benzoheterocyclic compound reactant is 4-keto-4,5,6,7-tetrahydrobenzothiophene.

6. The process defined in claim 2 wherein said keto-benzoheterocyclic compound reactant is 4-keto-4,5,6,7-tetrahydrobenzothiazole.

7. The process defined in claim 2 wherein said keto-benzoheterocyclic compound reactant is 4-keto-4,5,6,7-tetrahydrobenzofuran.

8. The process defined in claim 2 wherein said keto-benzoheterocyclic compound reactant is 4-keto-4,5,6,7-tetrahydrobenzoxazole.

References Cited by the Examiner

Fieser et al., J. Am. Chem. Soc., vol. 57 (1937), p. 1615.

MacArdle, "Use of Solvents," 1925, pp. 1–3.

ALEX MAZEL, *Primary Examiner.*

RICHARD J. GALLAGHER, *Assistant Examiner.*